(12) United States Patent
Kelaidis

(10) Patent No.: US 11,834,165 B2
(45) Date of Patent: Dec. 5, 2023

(54) METHOD FOR IMPROVING THE AERODYNAMIC BEHAVIOR OF ROTORCRAFT BLADES DURING HOVERING FLIGHT BY MOVING THE LEADING EDGE OF THE AERODYNAMIC PROFILES OF THESE BLADES

(71) Applicant: AIRBUS HELICOPTERS, Marignane (FR)

(72) Inventor: Manousos Kelaidis, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 1 day.

(21) Appl. No.: 17/477,935

(22) Filed: Sep. 17, 2021

(65) Prior Publication Data
US 2022/0111955 A1    Apr. 14, 2022

(30) Foreign Application Priority Data
Oct. 13, 2020  (FR) ........................ 2010434

(51) Int. Cl.
*B64C 27/467*    (2006.01)
*B23P 15/28*    (2006.01)

(52) U.S. Cl.
CPC ............ *B64C 27/467* (2013.01); *B23P 15/28* (2013.01)

(58) Field of Classification Search
None
See application file for complete search history.

(56) References Cited

U.S. PATENT DOCUMENTS

| 1,623,420 A | 4/1927 | Leinweber |
| 4,050,651 A * | 9/1977 | Neal ........................ B64C 13/16 244/82 |
| 4,248,572 A | 2/1981 | Fradenburgh |

(Continued)

FOREIGN PATENT DOCUMENTS

| EP | 0443901 A1 | 8/1991 |
| EP | 1342644 A1 | 9/2003 |

(Continued)

OTHER PUBLICATIONS

Wilby, P.G. et al. Aerodynamic Characteristics of NPL 9626 and NPL 9627, Further Aerofoils Designed for Helicopter Rotor Use. Aerodynamics Division, NPL, published in 1973.

(Continued)

*Primary Examiner* — Juan G Flores
(74) *Attorney, Agent, or Firm* — BROOKS KUSHMAN P.C.

(57) ABSTRACT

A method for improving a blade in an end zone of the blade, spanwise along the blade, and such an improved blade and a rotor comprising the improved blades. The leading edge of the aerodynamic profiles situated in the end zone is shifted from the upper surface half-profile towards the lower surface half-profile, then the leading edge sections of the two half-profiles are modified in order to connect the leading edge to the intermediate sections of the two half-profiles. Next, the blade is manufactured according to the modified aerodynamic profiles. Consequently, the negative camber of the aerodynamic profiles of the blade is thus increased, helping improve the aerodynamic performances of the blade during hovering flight.

20 Claims, 3 Drawing Sheets

(56) References Cited

U.S. PATENT DOCUMENTS

| | | | |
|---|---|---|---|
| 4,911,612 A | 3/1990 | Rodde et al. | |
| 5,121,815 A | 6/1992 | Francois et al. | |
| 5,344,102 A * | 9/1994 | Nakadate | B64C 27/467 |
| | | | 416/223 R |
| 5,879,131 A | 3/1999 | Arlton et al. | |
| 6,076,776 A * | 6/2000 | Breitbach | F01D 17/162 |
| | | | 244/214 |
| 6,361,279 B1 | 3/2002 | Rodde et al. | |
| 8,602,166 B2 | 12/2013 | Mullen et al. | |
| 9,624,798 B2 | 4/2017 | Mullen et al. | |
| 11,225,316 B2 * | 1/2022 | Fukari | B64C 27/473 |
| 2003/0188529 A1 | 10/2003 | Collet et al. | |
| 2016/0363208 A1 | 12/2016 | Louis | |
| 2017/0175875 A1 | 6/2017 | Lapeyre et al. | |
| 2018/0347687 A1 | 12/2018 | Waser | |
| 2020/0023940 A1 * | 1/2020 | Fukari | B64C 27/467 |
| 2020/0023953 A1 | 1/2020 | Fukari et al. | |

FOREIGN PATENT DOCUMENTS

| | | | |
|---|---|---|---|
| EP | 3104044 A1 | 12/2016 | |
| EP | 3527487 A1 | 8/2019 | |
| FR | 2626841 A1 | 8/1989 | |
| FR | 2658577 A1 | 8/1991 | |
| FR | 2685758 A1 | 7/1993 | |
| FR | 2765187 A1 | 12/1998 | |
| FR | 3045764 A1 | 6/2017 | |
| FR | 3077803 A1 * | 8/2019 | B64C 11/18 |

OTHER PUBLICATIONS

French Search Report for French Application No. FR2010434, Completed by the French Patent Office, dated Jun. 17, 2021, 12 pages.

* cited by examiner

METHOD FOR IMPROVING THE AERODYNAMIC BEHAVIOR OF ROTORCRAFT BLADES DURING HOVERING FLIGHT BY MOVING THE LEADING EDGE OF THE AERODYNAMIC PROFILES OF THESE BLADES

CROSS-REFERENCE TO RELATED APPLICATIONS

This application claims priority to French patent application No. FR 20 10434 filed on Oct. 13, 2020, the disclosure of which is incorporated in its entirety by reference herein.

TECHNICAL FIELD

The present disclosure concerns the field of aerodynamic profiles of blades and, more particularly, blades intended for a lift rotor of a rotorcraft.

The present disclosure relates to a method for improving a blade that helps increase the aerodynamic performances of the blade during hovering flight, and such an improved blade. This improved blade is intended to equip a rotor of an aircraft and, in particular, a lift rotor of a rotorcraft.

BACKGROUND

A rotorcraft, which may also be referred to as a "rotary-wing aircraft", conventionally comprises a fuselage and at least one lift rotor rotated by a power plant and providing at least partial lift and/or propulsion for the rotorcraft. The rotorcraft may also comprise an anti-torque device opposing the yaw torque exerted by the lift rotor on the fuselage of this rotorcraft and also helping control the yaw movements of this rotorcraft.

Conventionally, a blade extends longitudinally spanwise from a first end towards a second end. It is noted that the term "longitudinal" should be understood to refer to the direction of the span of the blade. The blade also extends transversely from a leading edge towards a trailing edge along the chords of the blade.

The blade comprises, in particular, an outer coating provided with a first skin on its upper surface and a second skin on its lower surface, as well as successive transverse sections. Each transverse section is defined by an aerodynamic profile comprising two half-profiles, namely a lower surface half-profile and an upper surface half-profile.

Existing aerodynamic profiles used frequently for aircraft rotor blades are, for example, defined according to the NACA families or indeed the OA families, the OA families being described, for example, in documents FR 2 626 841 and FR 2 765 187.

A blade is intended to be fastened to a rotating rotor hub at its first end, its second end being referred to as its free end. This rotating rotor hub rotates each blade. It should be understood that, relative to the axis of rotation of the rotor, the blade extends radially from the first end towards the second end.

Under the effect of an air flow generated by the rotation of the rotor, each blade of a rotor provides an aerodynamic force, generally referred to as thrust. This aerodynamic force varies in particular according to an aerodynamic angle of incidence of the blade, i.e., an angle between the air flow and a straight line connecting the leading edge and the trailing edge of this aerodynamic profile corresponding to the chord of this aerodynamic profile. In the case of a rotor, this angle of incidence is generally modified by rotating the blade about a pitch variation axis of the blade. This pitch variation axis extends substantially longitudinally spanwise along the blade. Hereinafter, the term "incidence" shall be used to refer more simply to the aerodynamic angle of incidence of the blade.

Therefore, each blade of a lift rotor is defined so as to provide an optimal aerodynamic force, with each blade operating at a positive incidence.

Moreover, the camber of an aerodynamic profile is a characteristic equal to the distance between the chord of the aerodynamic profile and a half-thickness line or "midline" of this aerodynamic profile, i.e., a line equidistant from the lower surface and upper surface half-profiles with respect to each normal to the midline. The distance between the chord and the midline is taken perpendicular to the chord and, therefore, a positive increase in camber corresponds to a positive increase in said distance. In particular, a camber is zero when the aerodynamic profile is symmetrical. Conversely, an aerodynamic profile with a non-zero camber is an asymmetric aerodynamic profile.

A positive increase in the camber of the aerodynamic profiles of a blade close to the leading edge has the effect of increasing the positive stall incidence of this blade. Therefore, the positive incidence of the blade may be increased while it is rotating, consequently increasing the aerodynamic force generated by the blade and its aerodynamic performances.

Furthermore, a rotorcraft is able to travel both at high forward speeds during cruising flights and at very low forward speeds, and can perform hovering flight. However, during hovering flight, significant aerodynamic drag may occur at the free end of the blade, where the air flow speed is the greatest. This aerodynamic drag may also increase quickly with the increase in the incidence of the blades owing to a particular phenomenon linked to the compressibility of the air and the occurrence of shock waves close to the leading edge of the aerodynamic profiles, near the free end of the blade. These shock waves form on the upper surface of the profiles and cause the separation of the boundary layer. This can result in an aerodynamic stall.

At a high blade incidence, of the order of 5 to 7 degrees (5 to 7°), and an air flow speed at the free end of the blade greater than or equal to 0.6 Mach, the aerodynamic drag close to this free end of the blade is increased significantly, being multiplied by 10, for example.

The Mach number is a dimensionless number expressing the speed of an object in its environment divided by the speed of sound in this environment. Since the speed of sound in a gas varies with its nature and its temperature, the Mach number depends on local temperature and atmospheric pressure conditions, in particular.

In order to attempt to limit this phenomenon, the document "Aerodynamic Characteristics of NPL 9626 and NPL 9627, Further Aerofoils Designed for Helicopter Rotor Use" by P. G. Wilby, N. Gregory and V. G. Quincey, Aerodynamics Division, NPL, published in 1973, describes a blade for a rotorcraft lift rotor comprising aerodynamic profiles modified at their leading edges. The leading edges of the aerodynamic profiles were lowered slightly, by approximately 1% to 1.5% of the chord c of these aerodynamic profiles.

Moreover, the UH 60A helicopter comprises a lift rotor provided with blades with a significant twist at the free end of each blade.

Documents EP 3 527 487, U.S. Pat. Nos. 1,623,420, 5,879,131 and 4,248,572 form part of the technological background of the disclosure.

SUMMARY

In these conditions, the present disclosure proposes a method for improving a blade in order to overcome the above-mentioned limitations and modify the aerodynamic profiles of an existing blade in order to obtain aerodynamic performances, during hovering flight, that are superior to the aerodynamic performances of this existing blade.

A blade extends in a longitudinal direction spanwise from a first end to a second end and in a transverse direction from a leading edge to a trailing edge. The blade comprises successive transverse sections, each transverse section being defined by an aerodynamic profile, each aerodynamic profile being defined, in particular, by two half-profiles including an upper surface half-profile and a lower surface half-profile, the two half-profiles each comprising a leading edge section, an intermediate section and a trailing edge section. In each profile, the leading edge sections start at the leading edge, the trailing edge sections end at the trailing edge and the intermediate sections are situated between the leading edge sections and the trailing edge sections respectively.

This blade is intended to be connected to a rotating rotor hub at the first end of the blade, by means of a blade shank, the second end being intended to be free.

The method for improving a blade according to the disclosure comprises the following steps:
  defining a straight-line segment connecting the leading edge and the trailing edge of the aerodynamic profile;
  shifting the leading edge of the aerodynamic profiles situated in a spanwise end zone of the blade comprising the second end, the shift being carried out from the upper surface half-profile towards the lower surface half-profile over a first distance $d1$ perpendicular to the straight-line segment;
  modifying the leading edge sections of the two half-profiles, connecting the leading edge to the intermediate sections of the two half-profiles in the end zone; and
  manufacturing the blade according to the modified aerodynamic profiles.

The straight-line segment is defined between the leading edge and the trailing edge of the aerodynamic profile. This straight-line segment has a length equal to the chord $c$ of the aerodynamic profile. Indeed, to reiterate, the chord $c$ of an aerodynamic profile is equal to a distance between the leading edge and the trailing edge of this aerodynamic profile.

Next, the leading edge of the aerodynamic profiles situated in the spanwise end zone of the blade is shifted, modifying the midline of these aerodynamic profiles from the upper surface half-profile towards the lower surface half-profile in the leading edge zone. This shifting of the leading edge of each aerodynamic profile in the end zone thus increases the camber of these aerodynamic profiles. This modification in the position of the leading edge of the aerodynamic profiles of the modified blade in the end zone and the resulting modification of their midlines help modify the air flow over the two half-profiles of the modified blade in the spanwise end zone of the blade, in particular causing a more gradual acceleration of the air flow over the upper surface half-profile. Therefore, the stall incidence of the modified blade is increased in this spanwise end zone of the blade, thus helping delay the onset of the shock waves and consequently reducing the aerodynamic drag significantly in this spanwise end zone of the blade, in particular during hovering flight or flight at low forward speeds.

As a result, the aerodynamic performances of this modified blade are improved during hovering flight or flight at low forward speeds.

The first distance $d1$ is, for example, between 2% and 8% of the chord $c$ of the aerodynamic profile in order not to modify the aerodynamic behavior of the modified blade significantly in flight phases other than hovering flight phases and, in particular, the aerodynamic performances at positive incidences. The first distance $d1$ may possibly be between 2.5% and 5% of the length of the chord $c$.

Following this shift of the leading edge of the aerodynamic profiles situated in the end zone, the leading edge section of the upper surface half-profile and the leading edge section of the lower surface half-profile are modified in order to connect the shifted leading edge with the intermediate section of the upper surface half-profile and the intermediate section of the lower surface half-profile, respectively.

Each leading edge section in the end zone is modified such that its tangency changes in a continuous manner and preferably has no inflection points. Each modified leading edge section starts at the leading edge and respectively ends at an intermediate section so as to be tangent to this intermediate section.

During the step of modifying the leading edge sections of the aerodynamic profiles in said end zone, the points defining the initial leading edge sections of the two upper surface and lower surface half-profiles may be shifted according to a parabolic law, namely a polynomial of degree 2, in order to form the modified leading edge sections of the two upper surface and lower surface half-profiles.

The modified leading edge sections of the two upper surface and lower surface half-profiles can also be defined by polynomials of degree 3, and have no inflection points.

The leading edge section of an aerodynamic profile may cover a second distance $d2$ parallel to the straight-line segment from the leading edge of between 5% and 50% of the chord $c$ of this aerodynamic profile.

Moreover, only the aerodynamic profiles situated in the spanwise end zone of the blade are modified, in order to improve the aerodynamic behavior of the blade in this end zone and not modify the aerodynamic behavior of the blade in the other zones of the blade. The spanwise end zone of the blade may, for example, cover a third spanwise distance $d3$ of between 10% and 25% of the blade radius. This blade radius is equal to the distance between the center of rotation of the blade, i.e., the axis of rotation of the rotor hub equipped with the blade, and the second end. The third distance $d3$ may be between 12% and 18% of the blade radius.

Finally, the method for improving a blade according to the disclosure comprises the step of manufacturing a blade in order to manufacture a blade defined by the aerodynamic profiles modified as described previously.

The method for improving a blade according to the present disclosure may also comprise the following steps carried out prior to the manufacturing step:
  shifting the trailing edge of the aerodynamic profiles in the spanwise end zone of the blade, the shift being carried out from the lower surface half-profile towards the upper surface half-profile over a fourth distance $d4$ perpendicular to the straight-line segment; and
  modifying the trailing edge sections of the two half-profiles connecting the intermediate sections of the two half-profiles to the trailing edge in the end zone.

This shifting of the trailing edge of the aerodynamic profiles in the end zone helps generate a slight upward deflection in the aerodynamic profile close to the trailing edge. This slight deflection advantageously helps counteract a nose-down moment that may be generated by the shifting of the leading edge. The fourth distance d4 is, for example, for each aerodynamic profile, between 1% and 2% of the chord c of this aerodynamic profile.

Following this shift of the trailing edge of the aerodynamic profiles situated in the end zone, the trailing edge section of the upper surface half-profile and the trailing edge section of the lower surface half-profile are modified in order to connect the shifted trailing edge with the intermediate section of the upper surface half-profile and the intermediate section of the lower surface half-profile, respectively.

Each trailing edge section is modified in the end zone such that its tangency changes in a continuous manner and preferably has no inflection points. Each modified trailing edge section starts respectively at an intermediate section, being tangent to this intermediate section, and ends at the trailing edge.

During the step of modifying the trailing edge sections of the aerodynamic profiles in said end zone, the points defining the initial trailing edge sections of the two upper surface and lower surface half-profiles may be shifted according to a smooth, continuous curve and, for example, according to a parabolic law, namely a polynomial of degree 2, in order to form the modified trailing edge sections of the two upper surface and lower surface half-profiles.

The modified trailing edge sections of the two upper surface and lower surface half-profiles can also be defined by polynomials of degree 3, and have no inflection points, or may be in any other smooth, continuous curved shape.

The trailing edge section of an aerodynamic profile may cover a fifth distance d5 parallel to the straight-line segment from the leading edge of between 5% and 20% of the chord c of this aerodynamic profile. The fifth distance d5 may possible be between 8% and 15% of the blade radius.

The shifting of the trailing edge and the modification of the trailing edge sections produce an upward deflection of the order of 10° at the trailing edge of the blade, in the end zone.

The object of the present disclosure is also a modified blade, also referred to as an "improved blade" in this text, defined by the aerodynamic profiles modified by the previously described steps of the method for improving a blade. This blade is produced using these modified aerodynamic profiles in the spanwise end zone of the blade.

The object of the present disclosure is also a rotor intended for an aircraft, this rotor comprising at least two improved blades as described previously, these improved blades being defined by the aerodynamic profiles modified by the steps of the method for improving a blade. This rotor is, for example, a lift rotor intended for a rotorcraft.

The object of the present disclosure is also a rotorcraft comprising a fuselage and at least one lift rotor. Said at least one lift rotor of the rotorcraft is a lift rotor as previously described and comprises, as such, at least two improved blades defined by aerodynamic profiles modified by the previously described method for improving a blade.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
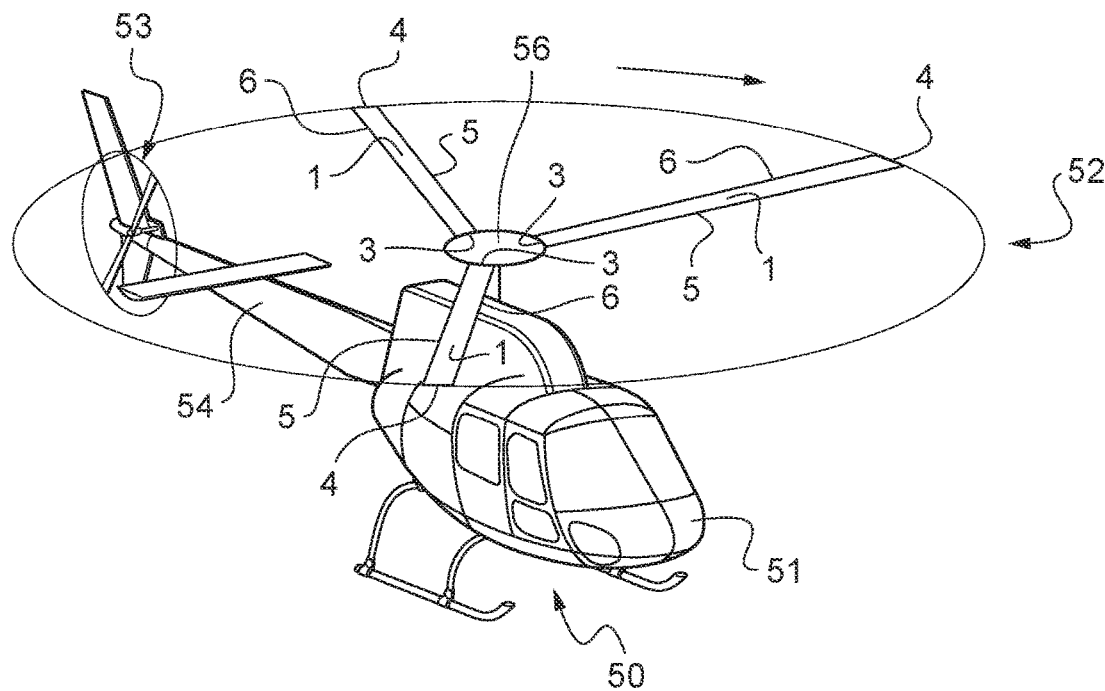
FIG. 1 shows a rotorcraft provided with blades.

A rotorcraft 50 shown in FIG. 1 comprises a fuselage 51 and a lift rotor 52. The rotorcraft 50 may further comprise, for example, an auxiliary anti-torque rotor 53 arranged on a tail boom 54. The lift rotor 52 comprises at least two blades 1. Each blade 1 extends spanwise from a first end 3 to a second end 4 and transversely from a leading edge 5 towards a trailing edge 6. The first end 3 is connected, for example, to a hub 56 of the lift rotor 52, whereas the second end 4 is free.

Figure 2:
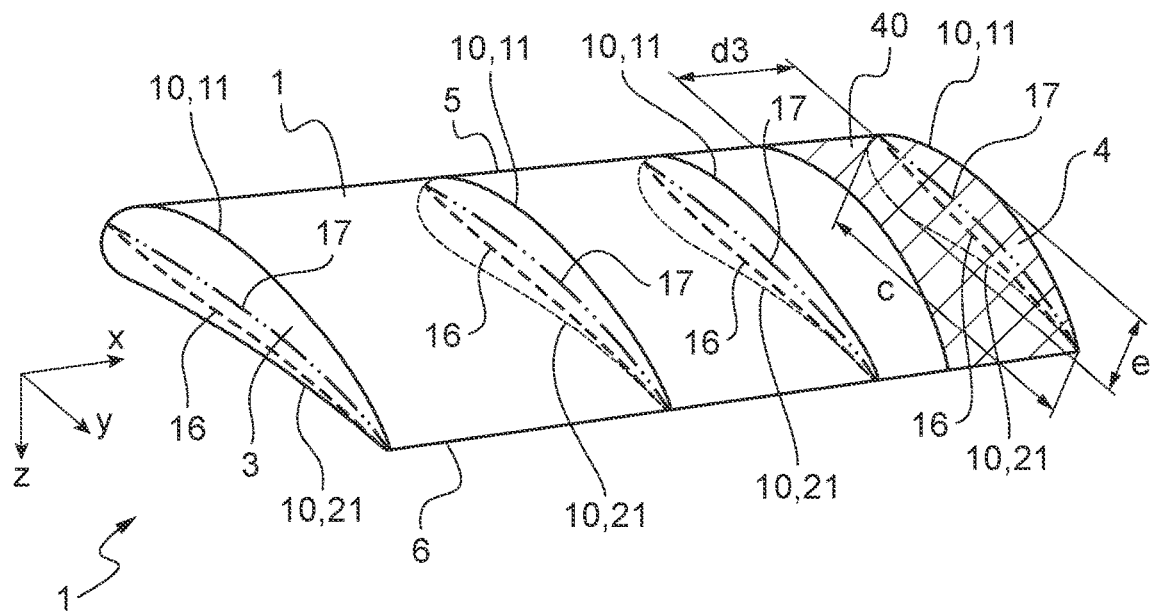
FIG. 2 shows a blade.
Figure 3:
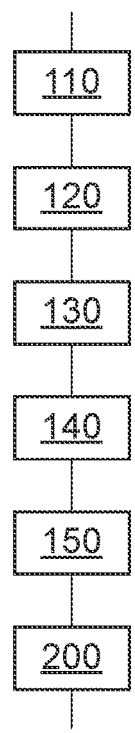
FIG. 3 is an overview diagram of a method for improving a blade.

A blade 1 is shown in FIG. 2. A reference frame (X,Y,Z) is shown in FIG. 3. This reference frame comprises a longitudinal direction X, a transverse direction Y and a vertical direction Z, these three directions being perpendicular to each other. The longitudinal direction X is substantially parallel to, or even coincident with, a pitch variation axis of the blade 1.

The blade 1 extends in the longitudinal direction X spanwise from the first end 3 to the second end 4 and in the transverse direction Y from the leading edge 5 towards the trailing edge 6. The blade 1 comprises successive transverse sections in a transverse plane parallel to the transverse direction Y and vertical direction Z, each transverse section being defined, in particular, by an aerodynamic profile 10 comprising, in particular, two half-profiles 11,21, namely an upper surface half-profile 11 and a lower surface half-profile 21. The upper surface half-profile 11 and the lower surface half-profile 21 respectively comprise a leading edge section 12,22 starting at the leading edge 5, a trailing edge section 14,24 ending at the trailing edge 6 and an intermediate section 13,23 situated between the leading edge section 12,22 and the trailing edge section 14,24.

The aerodynamic profiles 10 of these transverse sections generally change depending on their position, spanwise, along the blade 1, and may therefore be different, in particular in order to be adapted to the air flow received by each transverse section during the rotation of the blade 1.

FIG. 2 also shows a half-thickness line or "midline" 17 of the aerodynamic profile 10. This midline 17 is equidistant from the lower surface half-profile 21 and the upper surface half-profile 11 perpendicular to the midline 17. It can be seen that the aerodynamic profiles 10 of the blade 1 are asymmetrical and comprise a camber, this midline 17 being curved. A straight-line segment 16 connecting the leading edge 5 and the trailing edge 6 is also shown in FIG. 2 for several aerodynamic profiles 10. This straight-line segment 16 has a length equal to the chord c of the aerodynamic profile 10.

FIG. 2 also shows an end zone 40. This end zone 40 extends spanwise along the blade 1 close to the second free end 4 of the blade 1 and comprises this second end 4. This end zone covers the whole of the blade 1, transversely, from the leading edge 5 to the trailing edge 6.

FIG. 3 shows the overview diagram of a method for improving an initial blade in order to produce a modified blade referred to as an "improved blade" from an existing blade to be improved, this method comprising several steps. This method is intended to be applied to blades, for example intended to equip a lift rotor, and the successive transverse sections of which are formed by existing aerodynamic profiles, for example but not exclusively according to the NACA families or indeed the OA families.

A step 110 of defining a straight-line segment 16 is first carried out, the straight-line segment 16 connecting the leading edge 5 to the trailing edge 6 of an aerodynamic profile 10 situated in the end zone 40 is defined.

Next, a step 120 of shifting the leading edge 5 is carried out, the leading edges 5 of the aerodynamic profiles 10 of the blade 1 situated in the end zone 40 being shifted from the upper surface half-profile 11 towards the lower surface half-profile 21 over a first distance d1, perpendicular to the straight-line segment 16.

Figure 4:
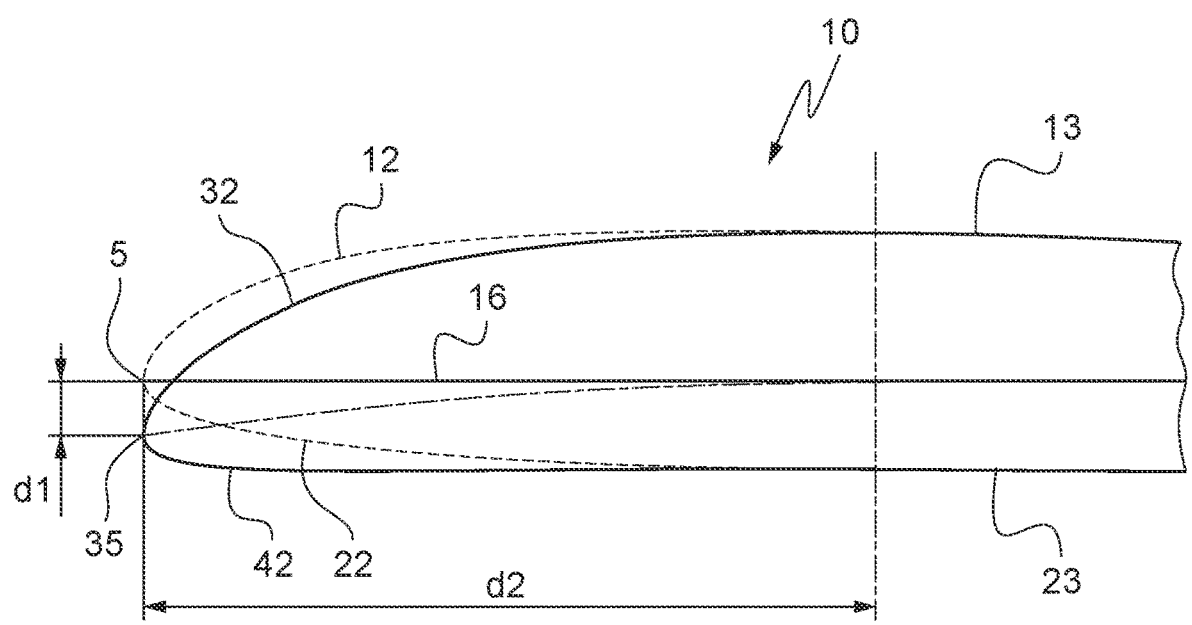
FIG. 4 is a diagram showing the modification of a leading edge section of an aerodynamic profile of a blade.

Such a shift of the leading edge 5 of an aerodynamic profile 10 is shown in FIG. 4. The aerodynamic profile 10 used and modified in this FIG. 3 is an OA309 aerodynamic profile.

The first distance d1 may be between 2% and 8% of the chord c of the aerodynamic profile 10, for example.

Following this shifting of the leading edge 5, a step 130 of modifying the leading edge sections 12,22 of the two half-profiles 11,21 is carried out. During this step 130, the upper surface 11 and lower surface 21 half-profiles of the blade 1 to be improved are modified in order to connect the leading edge 5 respectively to the two intermediate sections 13,23 of the two upper surface 11 and lower surface 21 half-profiles.

As shown in FIG. 4, only the leading edge section 12 of the upper surface half-profile 11 and the leading edge section 22 of the lower surface half-profile 21 are modified during this modification step 130. These modified leading edge sections 32,42 of the two half-profiles 11,21 connect the shifted leading edge 35 to the intermediate sections 13,23 of the two half-profiles 11,21. The intermediate sections 13,23 of the two half-profiles 11,21 are unchanged, as are the trailing edge sections 14,24.

These modified leading edge sections 32,42 connect the shifted leading edge 35 to the intermediate sections 13,23 respectively in a tangential manner. The modified leading edge sections 32,42 do not have any inflection points and have a tangency that changes in a continuous manner.

As a result, the air flow over the half-profiles 11,21 of the blade 1 in the end zone 40 is modified and produces an increase in the stall incidence of the blade 1 in this end zone 40. The aerodynamic performances of the modified blade 1 are therefore improved, in comparison with the initial blade, at least during hovering flight, by reducing the aerodynamic drag in this end zone 40.

During this modification step 130, the points defining the initial leading edge sections 12,22 of the two upper surface 11 and lower surface 21 half-profiles are shifted perpendicular to the straight-line segment 16, for example according to a parabolic law, in order to form the modified leading edge sections 32,42.

The leading edge section 12,22 of the two upper surface 11 and lower surface 21 half-profiles of an aerodynamic profile 10 may, for example, cover a second distance d2 parallel to the straight-line segment 16 from the leading edge 5 of between 5% and 50% of the chord c of this aerodynamic profile 10.

Moreover, the end zone 40 covers, for example, a third spanwise distance d3 of between 10% and 25% of the blade radius.

Figure 5:
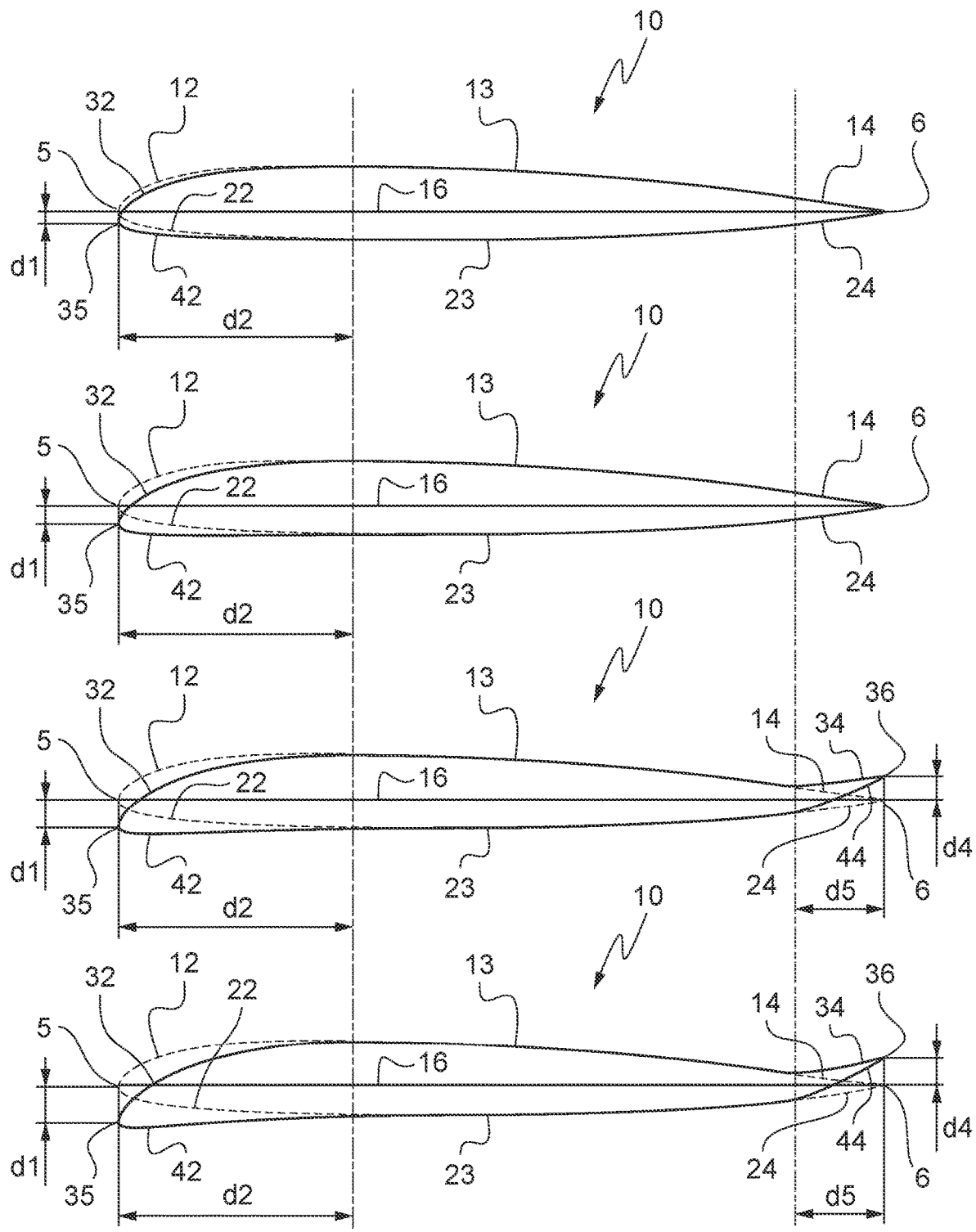
FIG. 5 shows four modified aerodynamic profiles of a blade.

FIG. 5 shows four examples of aerodynamic profiles 10 modified by the method according to the disclosure from the same aerodynamic profile. These four aerodynamic profiles 10 are constructed based on an OA309 aerodynamic profile and modified to give different values to the first distance d1 and the same value for the second distance d2 equal to 30% of the chord c, for example.

The method for improving a blade 1 according to the disclosure finally comprises a step 200 of manufacturing a blade 1 in order to manufacture a blade 1 defined by the aerodynamic profiles 10 modified during the preceding steps.

The method for improving a blade 1 according to the disclosure may also comprise two additional steps carried out prior to the manufacturing step 200.

During a step 140 of shifting the trailing edge 6 of the aerodynamic profiles 10 in the end zone 40, the shifting of the trailing edge 6 of these aerodynamic profiles 10 is carried out from the lower surface half-profile 21 towards the upper surface half-profile 11 over a fourth distance d4 perpendicular to the straight-line segment 16. This shifting of the trailing edge 6 can be seen in the last two aerodynamic profiles 10 shown in FIG. 5.

After shifting the trailing edge 6 in the end zone 40 in this way, a step 150 of modifying the trailing edge sections 14,24 of the two upper surface 11 and lower surface 21 half-profiles is carried out in order to connect the two intermediate sections 13,23 of the two upper surface 11 and lower surface 21 half-profiles to the shifted trailing edge 36.

As with the modified leading edge sections 32,42, the modified trailing edge sections 34,44 connect the shifted trailing edge 36 to the intermediate sections 13,23 respectively in a tangential manner, without inflection points and with a tangency that changes in a continuous manner.

During this modification step 150, the points defining the initial trailing edge sections 14,24 of the two upper surface 11 and lower surface 21 half-profiles are shifted perpendicular to the straight-line segment 16, for example according to a parabolic law, in order to form the modified trailing edge sections 34,44.

As a result, the air flow over the half-profiles 11,21 of the blade 1 in the end zone 40 is modified, producing an increase in the stall incidence of the blade 1 in this end zone 40 and therefore an improvement in the aerodynamic performances of the modified blade 1, in comparison with the initial blade, at least during hovering flight.

The fourth distance d4 is, for example, for each aerodynamic profile 10, between 1% and 2% of the chord c of this aerodynamic profile. Each trailing edge section 14,24 covers, for example, a fifth distance d5 parallel to the straight-line segment 16 of between 5% and 20% of the chord c of the aerodynamic profile 10.

This shifting of the trailing edge 6 of the aerodynamic profiles 10 helps generate a slight upward deflection in the blade 1 in the end zone 40 close to the trailing edge 6. This slight deflection, of the order of 10°, for example, advantageously helps counteract a nose-down moment that may be generated by the shifting of the leading edge 5.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A method for manufacturing a blade, the blade extending in a longitudinal direction spanwise from a first end to a second end and in a transverse direction from a leading edge towards a trailing edge, the blade comprising successive transverse sections, the transverse sections being defined by aerodynamic profiles, each of the aerodynamic profiles being defined by two half-profiles including an upper surface half-profile and a lower surface half-profile, the two half-profiles each comprising a leading edge section, an intermediate section and a trailing edge section, the first end being intended to be connected to a hub of a rotor, the second end being intended to be free,
wherein the method comprises the following steps:
defining a straight-line segment connecting the leading edge and the trailing edge of existing aerodynamic profiles;
shifting only the leading edge of the existing aerodynamic profiles situated in a spanwise end zone of the blade comprising the second end, the shift being carried out from the upper surface half-profiles towards the lower surface half-profiles over a first distance d1 perpendicular to the straight-line segment;
modifying the leading edge sections of the two half-profiles of the existing aerodynamic profiles connecting the leading edge to the intermediate sections of the two half-profiles in the spanwise end zone for obtaining modified aerodynamic profiles; and
manufacturing the blade according to the modified aerodynamic profiles.

2. The method according to claim 1,
wherein, a chord c of each of the existing aerodynamic profiles being equal to a distance between the leading edge and the trailing edge of each of the existing aerodynamic profiles, the distance d1 is, for each of the existing aerodynamic profiles in the spanwise end zone, between 2% and 8% of the chord c of each of the existing aerodynamic profiles, and the leading edge sections cover a second distance d2 parallel to the straight-line segment from the leading edge of between 5% and 50% of the chord c.

3. The method according to claim 1,
wherein the spanwise end zone of the blade covers a third spanwise distance d3 of between 10% and 25% of a radius of the blade, the radius being equal to the distance between the center of rotation of the blade and the second end.

4. The method according to claim 1,
wherein, during the step of modifying the leading edge sections of the two half-profiles, the modified leading edge sections are defined by a polynomial of degree 3 and do not have any inflection points.

5. The method according to claim 1,
wherein, during the step of modifying the leading edge sections of the aerodynamic profiles in the spanwise end zone, the points defining the leading edge sections of the two half-profiles are shifted according to a parabolic law.

6. A method for manufacturing a blade, the blade extending in a longitudinal direction spanwise from a first end to a second end and in a transverse direction from a leading edge towards a trailing edge, the blade comprising successive transverse sections, the transverse sections being defined by aerodynamic profiles, each of the aerodynamic profiles being defined by two half-profiles including an upper surface half-profile and a lower surface half-profile, the two half-profiles each comprising a leading edge section, an intermediate section and a trailing edge section, the first end being intended to be connected to a hub of a rotor, the second end being intended to be free,
wherein the method comprises the following steps:
defining a straight-line segment connecting the leading edge and the trailing edge of existing aerodynamic profiles;
shifting the leading edge of the existing aerodynamic profiles situated in a spanwise end zone of the blade comprising the second end, the shift being carried out from the upper surface half-profiles towards the lower surface half-profiles over a first distance perpendicular to the straight-line segment;
modifying the leading edge sections of the two half-profiles of the existing aerodynamic profiles connecting the leading edge to the intermediate sections of the two half-profiles in the spanwise end zone for obtaining modified aerodynamic profiles; and
manufacturing the blade according to the modified aerodynamic profiles;
wherein the method comprises the following steps carried out prior to the manufacturing step:
shifting the trailing edge of the existing aerodynamic profiles in the spanwise end zone of the blade, the shift of the trailing edge of the existing aerodynamic profiles in the spanwise end zone being carried out from the lower surface half-profiles towards the upper surface half-profiles over a fourth distance perpendicular to the straight-line segment; and
modifying the trailing edge sections of the two half-profiles of the existing aerodynamic profiles connecting the intermediate sections of the two half-profiles to the trailing edge in the spanwise end zone.

7. The method according to claim 6,
wherein, a chord of each of the existing aerodynamic profiles being equal to a distance between the leading edge and the trailing edge of each of the existing aerodynamic profiles, the fourth distance is, for each of the existing aerodynamic profiles in the spanwise end zone, between 1% and 2% of the chord of each of the existing aerodynamic profiles and the trailing edge sections cover a fifth distance parallel to the straight-line segment from the trailing edge of between 5% and 20% of the chord.

8. The method according to claim 6,
wherein, during the step of modifying the leading edge sections of the two half-profiles, the modified leading edge sections are defined by a polynomial of degree 3 and do not have any inflection points.

9. The method according to claim 6,
wherein, during the step of modifying the leading edge sections of the aerodynamic profiles in the spanwise end zone, the points defining the leading edge sections of the two half-profiles are shifted according to a parabolic law.

10. A blade for an aircraft extending in a longitudinal direction spanwise from a first end to a second end and in a transverse direction from a leading edge towards a trailing edge, the blade comprising successive transverse sections, the transverse sections being defined by aerodynamic profiles, each of the aerodynamic profiles being defined by two half-profiles including an upper surface half-profile and a lower surface half-profile, the two half-profiles each comprising a leading edge section, an intermediate section and a trailing edge section, the first end being intended to be connected to a rotor hub, the second end being intended to be free, wherein the blade is produced using aerodynamic profiles modified by a method according to claim 1.

11. A rotor intended for an aircraft, the rotor comprising at least two blades according to claim 10.

12. A rotorcraft comprising a fuselage and at least one lift rotor,
wherein each of the at least one lift rotor comprises at least two blades according to claim 10.

13. A method for manufacturing a lift rotor blade, the lift rotor blade extending in a longitudinal direction spanwise from a first end to a second end and in a transverse direction from a leading edge towards a trailing edge, the lift rotor blade comprising successive transverse sections defined by aerodynamic profiles, each of the aerodynamic profiles being defined by two half-profiles including an upper surface half-profile and a lower surface half-profile, the two half-profiles each comprising a leading edge section, an intermediate section and a trailing edge section, the first end connectable to a hub of a rotor, the second end being free, the method comprises:
defining a straight-line segment connecting the leading edge and the trailing edge of existing aerodynamic profiles;
shifting only the leading edge of the existing aerodynamic profiles situated in a spanwise end zone of the lift rotor blade comprising the second end, the shift being from the upper surface half-profiles towards the lower surface half-profiles over a first distance perpendicular to the straight-line segment;
modifying the leading edge sections of the two half-profiles of the existing aerodynamic profiles connecting the leading edge to the intermediate sections of the two half-profiles in the spanwise end zone to obtain modified aerodynamic profiles; and
manufacturing the lift rotor blade according to the modified aerodynamic profiles.

14. The method according to claim 13,
wherein, a chord of each of the existing aerodynamic profiles being equal to a distance between the leading edge and the trailing edge of each of the existing aerodynamic profiles, the first distance is, for each of the existing aerodynamic profiles in the spanwise end zone, between 2% and 8% of the chord of each of the existing aerodynamic profiles, and the leading edge sections cover a second distance parallel to the straight-line segment from the leading edge of between 5% and 50% of the chord.

15. The method according to claim 13,
wherein the spanwise end zone of the lift rotor blade covers a third spanwise distance of between 10% and 25% of a radius of the lift rotor blade, the radius being equal to the distance between the center of rotation of the lift rotor blade and the second end.

16. The method according to claim 13,
wherein, during the step of modifying the leading edge sections of the two half-profiles, the modified leading edge sections are defined by a polynomial of degree 3 and do not have any inflection points.

17. The method according to claim 13,
wherein, during the step of modifying the leading edge sections of the aerodynamic profiles in the spanwise end zone, the points defining the leading edge sections of the two half-profiles are shifted according to a parabolic law.

18. A lift rotor blade for an aircraft extending in a longitudinal direction spanwise from a first end to a second end and in a transverse direction from a leading edge towards a trailing edge, the lift rotor blade comprising successive transverse sections, the transverse sections being defined by aerodynamic profiles, each of the aerodynamic profiles being defined by two half-profiles including an upper surface half-profile and a lower surface half-profile, the two half-profiles each comprising a leading edge section, an intermediate section and a trailing edge section, the first end being intended to be connected to a rotor hub, the second end being intended to be free,
wherein the lift rotor blade is produced using aerodynamic profiles modified by a method according to claim 13.

19. A lift rotor intended for an aircraft, the rotor comprising at least two blades according to claim 18.

20. A rotorcraft comprising a fuselage and at least one lift rotor,
wherein each of the at least one lift rotor comprises at least two blades according to claim 18.

* * * * *